(12) United States Patent
Kanada et al.

(10) Patent No.: US 10,777,815 B2
(45) Date of Patent: Sep. 15, 2020

(54) LITHIUM NICKEL CONTAINING COMPOSITE OXIDE AND MANUFACTURING METHOD THEREOF, AND NONAQUEOUS-ELECTROLYTE SECONDARY BATTERY

(71) Applicants: SUMITOMO METAL MINING CO., LTD., Tokyo (JP); SHINSHU UNIVERSITY, Nagano (JP)

(72) Inventors: Satoshi Kanada, Chiba (JP); Katsuya Teshima, Nagano (JP); Nobuyuki Zettsu, Nagano (JP); Takeshi Kimijima, Nagano (JP)

(73) Assignees: SUMITOMO METAL MINING CO., LTD., Tokyo (JP); SHINSHU UNIVERSITY, Nagano (JP)

( * ) Notice: Subject to any disclaimer, the term of this patent is extended or adjusted under 35 U.S.C. 154(b) by 191 days.

(21) Appl. No.: 15/766,104

(22) PCT Filed: Oct. 11, 2016

(86) PCT No.: PCT/JP2016/080149
§ 371 (c)(1),
(2) Date: Apr. 5, 2018

(87) PCT Pub. No.: WO2017/061633
PCT Pub. Date: Apr. 13, 2017

(65) Prior Publication Data
US 2018/0309124 A1    Oct. 25, 2018

(30) Foreign Application Priority Data
Oct. 9, 2015    (JP) .................................. 2015-200817

(51) Int. Cl.
*H01M 4/52*    (2010.01)
*H01M 4/525*    (2010.01)
(Continued)

(52) U.S. Cl.
CPC ............ *H01M 4/525* (2013.01); *C01G 53/42* (2013.01); *H01M 4/131* (2013.01);
(Continued)

(58) Field of Classification Search
CPC .... H01M 4/131; H01M 4/1391; H01M 4/364; H01M 4/525; H01M 10/052;
(Continued)

(56) References Cited

U.S. PATENT DOCUMENTS 9,859,557 B2 *   1/2018   Mori ..................... H01M 4/485
9,947,916 B2 *   4/2018   Oda ....................... H01M 4/131
(Continued)

FOREIGN PATENT DOCUMENTS

JP     2000-72446 A     3/2000
JP     2001-243949 A    9/2001
(Continued)

OTHER PUBLICATIONS

Machine translation of JP 2008-266741 (no date).*
(Continued)

*Primary Examiner* — Amanda C. Walke
(74) *Attorney, Agent, or Firm* — Katten Muchin Rosenman LLP

(57) ABSTRACT

A cathode active material that is able to improve storage characteristics without deteriorating charging and discharging capacity is provided. By mixing lithium nickel containing composite oxide particles comprising a layered rock-salt type crystal structure, a lithium compound, and an alkali metal compound; calcining the mixed powder at a temperature range of 800° C. to 1000° C.; washing and removing alkali metal other than lithium; mixing washed calcined particles with a lithium compound again; calcining the mixture in an oxidizing atmosphere at a temperature range of 600° C. to 800° C., lithium nickel containing composite
(Continued)

oxide comprising a layered rock-salt type crystal structure and a peak intensity ratio of (003) plane with respect to (104) plane of 1.2 or more that are obtained by X-ray powder diffraction using Cu-Kα ray as an X-ray source is obtained.

12 Claims, 2 Drawing Sheets

(51) Int. Cl.
| | | |
|---|---|---|
| C01G 53/00 | (2006.01) | |
| H01M 4/131 | (2010.01) | |
| H01M 4/1391 | (2010.01) | |
| H01M 4/36 | (2006.01) | |
| H01M 10/052 | (2010.01) | |
| H01M 10/0525 | (2010.01) | |
| H01M 4/02 | (2006.01) | |

(52) U.S. Cl.
CPC ......... *H01M 4/1391* (2013.01); *H01M 4/364* (2013.01); *H01M 10/052* (2013.01); *C01P 2002/74* (2013.01); *C01P 2004/03* (2013.01); *C01P 2006/12* (2013.01); *H01M 10/0525* (2013.01); *H01M 2004/021* (2013.01); *H01M 2004/028* (2013.01)

(58) Field of Classification Search
CPC ........ H01M 10/0525; H01M 2004/021; C01G 53/53; C01G 53/42; C01P 2002/74; C01P 2004/03; C01P 2006/12
USPC ........................................................ 429/527
See application file for complete search history.

(56) References Cited

U.S. PATENT DOCUMENTS

| | | |
|---|---|---|
| 2003/0022063 A1 | 1/2003 | Paulsen et al. |
| 2015/0037676 A1* | 2/2015 | Yamauchi ............... C01G 53/00 429/223 |
| 2015/0380737 A1 | 12/2015 | Kawasato et al. |
| 2016/0071552 A1* | 3/2016 | Ohwada .................. H02J 9/061 365/185.08 |
| 2016/0099469 A1* | 4/2016 | Paulsen .................. C01G 53/50 429/223 |
| 2016/0164093 A1 | 6/2016 | Inoue et al. |
| 2016/0372748 A1* | 12/2016 | Nakayama ............. C01G 53/42 |
| 2017/0352885 A1* | 12/2017 | Kondo .................. H01M 4/628 |

FOREIGN PATENT DOCUMENTS

| | | |
|---|---|---|
| JP | 2001-266876 A | 9/2001 |
| JP | 2002-110167 A | 4/2002 |
| JP | 2005-251716 A | 9/2005 |
| JP | 2008226741 A * | 9/2008 |
| JP | 2016-026981 A | 2/2016 |
| WO | 2015/012284 A1 | 1/2015 |

OTHER PUBLICATIONS

International Search Report and Written Opinion dated Dec. 13, 2016, from the corresponding PCT/JP2016/080149, 9 pages.

Song, M.Y. et al, Electrochemical properties of LiNi1-yMy02 (M=Ni, Ga, Al and/or Ti) cathodes, Ceramics International, Jul. 25, 2008, vol. 35, No. 3, p. 1145-1150, DOI:10.1016/j.ceramint.2008.05.015.

Hwang, B.J. et al, Effect of synthesis conditions on electrochemical properties of LiNi1-yCoy02 cathode for lithium rechargeable batteries, Journal of Power Sources, Nov. 27, 2002, vol. 114, No. 2, p. 244-252, DOI:10.1016/S0378-7753(02)00584-0.

Park, T.J. et al, Effect of Calcination Temperature of Size Controlled Microstructure of LiNi0.8Co0.15Al0.05o2 Cathode for Rechargeable Lithium Battery, Bulletin of the Korean Chemical Society, Feb. 2014, vol. 35, No. 2, p. 357-364, DOI:10.5012/bkcs.2014.35.2.357.

* cited by examiner

LITHIUM NICKEL CONTAINING COMPOSITE OXIDE AND MANUFACTURING METHOD THEREOF, AND NONAQUEOUS-ELECTROLYTE SECONDARY BATTERY

TECHNICAL FIELD

The present invention relates to a lithium nickel containing composite oxide, which is used as a cathode active material for a nonaqueous-electrolyte secondary battery, and a manufacturing method thereof and a nonaqueous-electrolyte secondary battery that uses the lithium nickel containing composite oxide as a cathode material.

BACKGROUND ART

In recent years, with the spread of portable electronic equipment such as portable telephones and notebook-sized personal computers, there is a strong need for development of a compact and lightweight nonaqueous-electrolyte secondary battery having high energy density. There is also a strong need for development of a high-output secondary battery as a power source for driving a motor, and particularly as a battery of the power source of transport equipment.

As a secondary battery that satisfies such a demand, there is a lithium ion secondary battery which is a nonaqueous-electrolyte secondary battery. A nonaqueous-electrolyte secondary battery includes an anode, a cathode, an electrolyte and the like, and as an active material for the anode and cathode, a material capable of insertion and desorption of lithium ion is used.

Currently, as the cathode material of this kind of nonaqueous-electrolyte secondary battery, lithium transition metal containing composite oxide such as lithium cobalt composite oxide ($LiCoO_2$) for which synthesis is relatively easy, lithium nickel composite oxide ($LiNiO_2$) that uses nickel that is less expensive than cobalt, lithium nickel cobalt manganese composite oxide ($LiNi_{1/3}Co_{1/3}Mn_{1/3}O_2$), lithium manganese composite oxide ($LiMn_2O_4$) that use manganese, and lithium nickel manganese composite oxide ($LiNi_{0.5}Mn_{0.5}O_2$) have been proposed.

It is required for a nonaqueous-electrolyte secondary battery to have characteristics such as high capacity, output characteristics, retention characteristics, and cycle characteristics. The characteristics of this kind of nonaqueous-electrolyte secondary battery are affected by the characteristics of the cathode active material used for its cathode material. In order to provide a nonaqueous-electrolyte secondary battery having this kind of excellent characteristics, many kinds of cathode active material have been proposed.

For example, JP2001-266876 (A) discloses a cathode active material comprising a lithium nickel containing composite oxide that is expressed by a general formula: $Li_xNi_yCo_zAl_{(1-y-z)}O_2$, where $0.05 \leq x \leq 1.10$, $0.7 \leq y \leq 0.9$, $0.05 \leq z \leq 0.18$, and $0.85 \leq y+z \leq 0.98$, a specific surface area thereof is 0.7 $m^2/g$ or less, and a tap density thereof is 2.3 g/ml or more. As this cathode active material has a stable crystal structure, by using this as a cathode active material, it is possible for a nonaqueous-electrolyte secondary battery to have a high capacity while improving the storage characteristics (performance retention characteristics in a storage state) under high-temperature conditions.

Further, JP2005-251716 (A) discloses a cathode active material comprising a lithium transition metal composite hydroxide having an excellent packing efficiency in order to improve characteristics of a nonaqueous-electrolyte secondary battery such as the thermal stability, load characteristics, output characteristics, by focusing on the structure of primary particles and preventing the generation of fine particles due to pulverization of the primary particles. This lithium transition metal composite oxide is being composed of particles of either or both primary particles and/or secondary particles that are aggregates of the primary particles, and has an aspect ratio of 1 to 1.8, and at least has an element selected from a group consisting of molybdenum, vanadium, tungsten, boron, and fluorine at least on its surface. Among these added elements, especially boron works as flux and promotes the crystal growth of the particles, and improves storage characteristics of a nonaqueous-electrolyte secondary battery using this cathode active material as a cathode material.

However, when boron is used as flux, as the amount of boron increases to even promote the crystal growth, boron remains as impurities and may cause problems such as deterioration of electrochemical characteristics.

PATENT LITERATURE

[Patent Literature 1] JP2001-266876
[Patent Literature 2] JP2005-251716

SUMMARY OF INVENTION

Problem to be Solved by Invention

The purpose of the present invention is to provide a cathode active material that is able to improve retention characteristics without deteriorating charging and discharging capacity, more specifically, a cathode active material of a lithium nickel containing composite oxide having a high crystallinity and a larger primary particle size compared to that of the conventional lithium nickel containing composite oxide.

Means for Solving Problems

A first aspect of the present invention is related to a lithium nickel containing composite oxide that mainly contains nickel (Ni) as a transition metal. The lithium nickel containing composite oxide has a layered rock-salt type crystal structure, and is characterized in having a peak intensity ratio of (003) plane with respect to (104) plane that are obtained by X-ray powder diffraction using Cu-Kα ray as an X-ray source is 1.2 or more.

In a lithium nickel containing composite oxide of the present invention, it is preferable that the relation of peak intensity between (006) plane, (102) plane, and (101) plane, which are obtained from X-ray powder diffraction using Cu-Kα ray as an X-ray source, satisfies $[(006)+(102)]/(101) \leq 0.6$.

In a lithium nickel containing composite oxide of the present invention, it is preferable that the lithium site occupancy at 3$a$ site in the layered rock-salt type crystal structure obtained by Rietvelt analysis is 96% or more.

The lithium nickel containing composite oxide of the present invention preferably contains cobalt (Co) or aluminum (Al) as an added element. Further, the lithium nickel containing composite oxide preferably has a composition that is expressed by a general formula: $Li_{1+u}Ni_xCo_yAl_zO_2$, where $-0.03 \leq u \leq 0.10$, $x+y+z=1$, $0.50 \leq x \leq 1.0$, $0 \leq y \leq 0.50$, and $0 \leq z \leq 0.10$.

The lithium nickel containing composite oxide of the present invention preferably has an average primary particle size of 2.0 μm or more, and a BET specific surface area of 0.35 m²/g or less.

One aspect of the present invention relates to a manufacturing method of a lithium nickel containing composite oxide. The manufacturing method comprises:

a mixing process wherein lithium nickel containing composite oxide particles that have a layered rock-salt type crystal structure and mainly contains nickel (Ni) as a transition metal; a lithium compound; and an alkali metal compound are mixed to obtain mixed powder, a first calcination process that calcines the mixed powder at the temperature range of 800° C. to 1000° C. to obtain calcined particles, a washing process that removes alkali metal elements other than lithium by washing the calcined particles, a second calcination process that mixes the washed calcined particles with a lithium compound to obtain a mixture and calcines the mixture in an oxidizing atmosphere at a temperature range of 600° C. to 800° C. to obtain a lithium nickel containing composite oxide that has a layered rock-salt type crystal structure and has a peak intensity ratio of (003) plane with respect to (104) plane obtained from X-ray powder diffraction using Cu-Kα ray as an X-ray source of 1.2 or more.

In the mixing process, it is preferable to mix the alkali metal compound so that the ratio (molar ratio) of the amount of substance of the alkali metal compound with respect to the total amount of substance of the amount of substance of the metal elements excluding lithium that form the lithium nickel containing composite oxide and the amount of substance of the alkali metal compound becomes to be within a range of 0.55 to 0.99.

In the mixing process, it is preferable to use chloride; carbonate; sulfate; or a mixture of these that contain one or more alkali metal that is selected at least from among Li, Na, and K as the alkali metal compound.

In the mixing process, it is preferable to mix the lithium compound so that the ratio (molar ratio) of the amount of substance of Li in the lithium compound with respect to the amount of substance of the metal elements excluding lithium that form the lithium nickel containing composite oxide to be within a range of 0 to 0.30.

As for the calcination time of the first calcination process, it is preferable to make the retention time at a predetermined calcination temperature for 10 hours or less.

It is preferable to set the retention time of the second calcination process to be within a range of 1 hour to 20 hours.

It is preferable to adjust for the lithium nickel containing composite oxide obtained eventually to have a composition that is expressed by a general formula: $Li_{1+u}Ni_xCo_yAl_zO_2$, where $-0.03 \le u \le 0.10$, $x+y+z=1$, $0.50 \le x \le 1.0$, $0 \le y \le 0.50$, and $0 \le z \le 0.10$.

One aspect of the present invention relates to a nonaqueous-electrolyte secondary battery. The secondary battery comprises a cathode, anode, separator and nonaqueous-electrolyte, and it is characterized that the above lithium nickel containing composite oxide of the present invention is used as the cathode material of the cathode.

Effect of Invention

With the present invention, it is possible to produce a lithium nickel containing composite oxide that contains primary particles having a larger particle diameter and higher crystallinity compared to that of conventional technology, and when a cathode active material of such a lithium nickel containing composite oxide is used as a cathode material of a nonaqueous-electrolyte secondary battery, compared to the conventional technology, it is possible to provide a cathode active material that is able to improve retention characteristics without deteriorating a charging and discharging capacity.

Further, by using a cathode active material having a high crystallinity and a large primary particle size, when being charged, i.e. when a state is retained where lithium ions are desorbed from the cathode active material, due to the high stability of the crystal, the elution of elements from the cathode active material is suppressed. As a result, self-discharge is suppressed and it becomes possible to provide a good lithium ion secondary battery.

Further, with the present invention, it is possible to provide an efficient manufacturing method of this kind of lithium nickel containing composite oxide powder on an industrial scale, so the industrial value of the present invention is very high.

MODES FOR CARRYING OUT INVENTION

Figure 1:
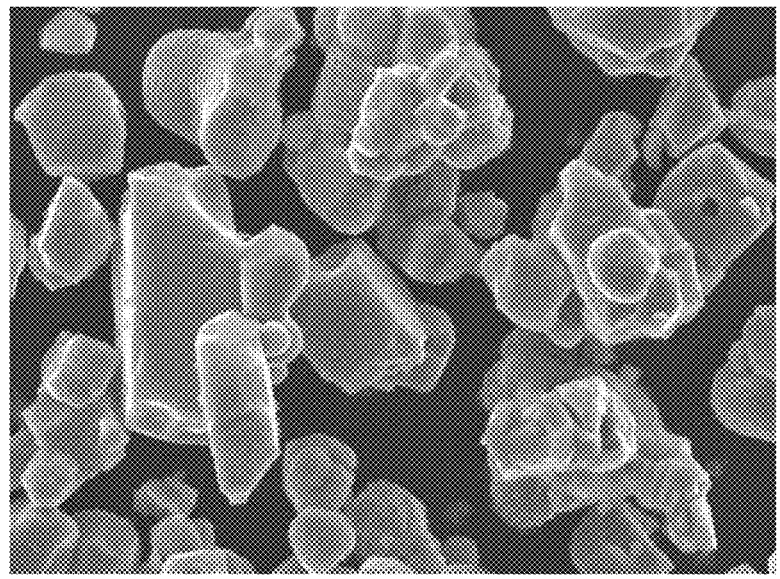
FIG. 1 is a SEM photograph (2000× magnification rate) that illustrates a lithium nickel containing composite oxide obtained in Example 1 of the present invention.
Figure 2:
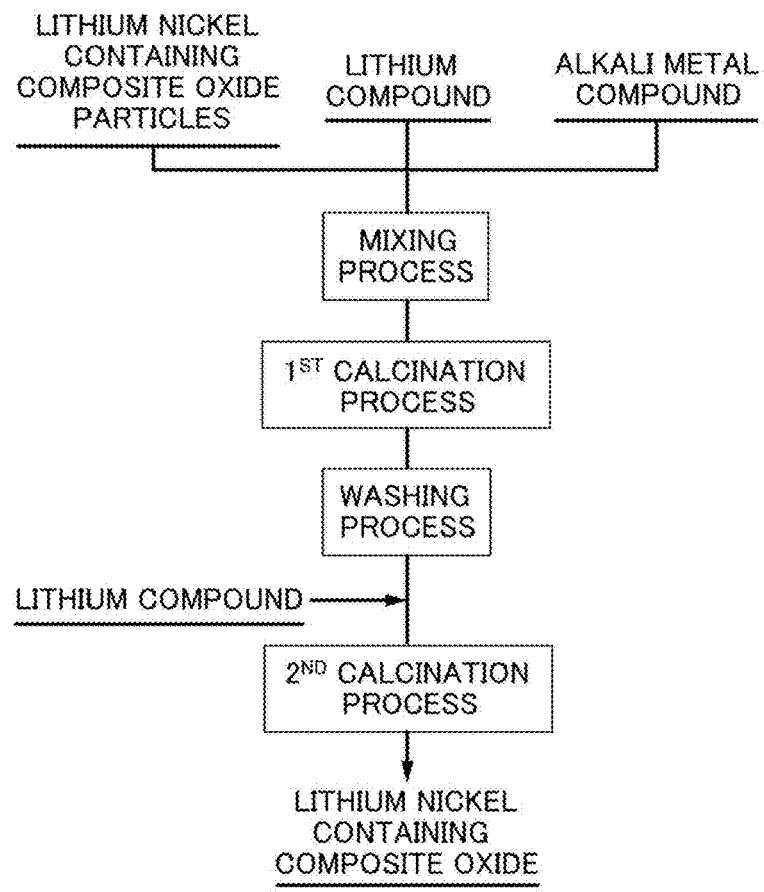
FIG. 2 is a flowchart that illustrates a manufacturing process of the lithium nickel containing composite oxide of the present invention.
Figure 3:
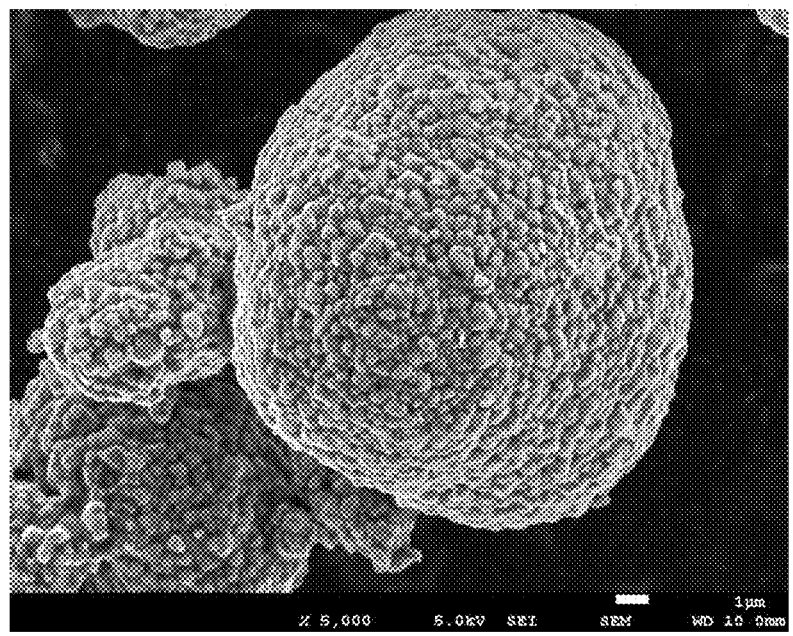
FIG. 3 is a SEM image that illustrates lithium nickel containing composite oxide particles that comprises a conventional particle shape and becomes a starting material in the present invention.

The inventors of the present invention used lithium nickel containing composite oxide particles having an already-obtained layered rock-salt type crystal structure instead of a precursor as a starting material, and by using a predetermined flux, they found that it is possible to obtain a lithium nickel containing composite oxide mainly formed of primary particles with less disruption in the crystal structure, large particle size, and less aggregation.

The present invention was invented based on this finding. The details of the present invention will be explained hereinafter.

(1) Lithium Nickel Containing Composite Oxide

The present invention relates to a lithium nickel containing composite oxide that mainly contains nickel (Ni) as a transition metal. Especially, the lithium nickel containing composite oxide of the present invention is characterized in having a layered rock-salt type crystal structure and the ratio of the peak intensity of (003) plane with respect to (104) plane that are obtained by X-ray powder diffraction using Cu-Kα ray as an X-ray source is 1.2 or more.

[Composition]

As stated above, the present invention is characterized in making the crystallinity of a lithium nickel containing composite oxide high, as well as forming a lithium nickel containing composite oxide with primary particles having a large primary particle size. As long as the lithium nickel containing composite oxide comprises a layered rock-salt type crystal structure, it may not be limited to that composition, and it can be widely applicable to a lithium nickel containing composite oxide that mainly contains nickel (Ni) as a transition metal. Here, "mainly containing nickel" means that nickel is contained so that an atomic ratio of nickel with respect to the total amount of transition metals and added metal elements excluding lithium is 0.5 or more. Especially, the present invention is suitably applied to a cathode active material of lithium nickel containing composite oxide that contains cobalt (Co) or aluminum (Al) as an added element.

More specifically, it is preferable that the lithium nickel containing composite oxide of the present invention has a composition that is expressed by a general formula: $Li_{1+u}Ni_xCo_yAl_zO_2$, where $-0.03 \leq u \leq 0.10$, $x+y+z=1$, $0.50 \leq x \leq 1.0$, $0 \leq y \leq 0.50$, and $0 \leq z \leq 0.10$.

In the present invention, the value "u" which indicates the amount of lithium (Li) is adjusted to be −0.03 or greater and 0.10 or less, preferably to be −0.02 or greater and 0.05 or less, more preferably to be 0 or greater and 0.04 or less. By doing this, it becomes possible for a secondary battery using this lithium nickel containing composite oxide as a cathode material to secure sufficient charging and discharging capacity and output characteristics. On the other hand, when the value "u" is less than −0.03, cathode resistance of a secondary battery becomes high so that output characteristics deteriorate. Contrary to this, when the value "u" exceeds 0.10, charging and discharging capacity and output characteristics of a secondary battery decrease.

Nickel (Ni) is an element that contributes to making an electrical potential higher and increasing capacity, and the value "x" that indicates its content is adjusted to be 0.50 or greater and 1.0 or less, preferably to be 0.75 or greater and 0.95 or less, more preferably to be 0.80 or greater and 0.85 or less. When the value "x" is less than 0.50, it is not possible to improve charging and discharging capacity of a secondary battery using this cathode active material.

Cobalt (Co) is an element that contributes to improving charge and discharge cycle characteristics, and the value "y" that indicates its content is adjusted to be 0.50 or less, preferably to be 0.10 or greater and 0.30 or less, more preferably to be 0.10 or greater and 0.20 or less. When the value "y" exceeds 0.50, charging and discharging capacity of a secondary battery using this cathode active material greatly decreases.

Aluminum (Al) is an element that contributes to improving thermal stability, and the value "z" that indicates its content is adjusted to be 0.10 or less, preferably to be 0.01 or greater and 0.08 or less, more preferably to be 0.01 or greater and 0.05 or less. When the value "z" exceeds 0.10, metal elements that contribute to the Redox reaction decrease, so the charging and discharging capacity decreases.

In the lithium nickel containing composite oxide of the present invention as well, it is possible to include additional added elements in addition to nickel, cobalt, and aluminum in order to improve the durability and the output characteristics of a secondary battery. As for such added elements, one or more element that is selected from a group of manganese (Mn), iron (Fe), titanium (Ti), vanadium (V), magnesium (Mg), zirconium (Zr), strontium (Sr), silicon (Si), tungsten (W), molybdenum (Mo), chromium (Cr), and niobium (Nb) can be used.

When these elements are to be included, it is preferable to adjust an atomic ratio of the added element content to be 0.15 or less, preferably to be 0.10 or less with respect to the total amount of transition metal and added elements.

Aluminum and additional added elements may be uniformly dispersed in the particle interior of a lithium nickel containing composite oxide, and they also may be coated on the particle surface. Further, the surface may be coated in a state where additional added elements are uniformly dispersed in the particle interior.

Further, the content of lithium, nickel, cobalt, aluminum, and additional added elements can be measured by an ICP emission spectrophotometry.

[Crystal Structure and Lithium Occupancy Rate]

The lithium nickel containing composite oxide of the present invention has a layered rock-salt type crystal structure and high crystallinity. Specifically, when each of sites $3a$, $3b$, and $6c$ that form the lithium nickel containing composite oxide of the present invention is expressed by $[Li_{1+u}]_{3a}[Ni_xCo_yAl_z]_{3b}[O_2]_{6c}$, the lithium occupancy rate at $3a$ site that is obtained by Rietvelt analysis of X-ray diffraction is 96.0% or more, preferably 96.5% or more, more preferably 97.0% or more, further preferably 98.0% or more. By having such high lithium occupancy rate, in a secondary battery using the lithium nickel containing composite oxide as a cathode material, it is possible to achieve high charging and discharging capacity.

[Particle Properties]

In the lithium nickel containing composite oxide of the present invention, the average particle size of primary particles is 2.0 μm or more, preferably within the range of 2.5 μm to 50 μm, and more preferably within the range of 3.0 μm to 10 μm. By making the average particle size of primary particles 2.0 μm or more, it is possible for a cathode active material to be composed of primary particles that have no grain boundaries and are relatively large. As a result, in a secondary battery using this as a cathode material, it is possible to improve cycling characteristics and storage characteristics. However, when the average particle size of primary particles exceeds 50 μm, the specific surface area becomes too small so that output characteristics extremely deteriorate.

The average particle size of primary particles can be measured with an observation using a scanning electron microscope (SEM). Specifically, it can be obtained by, after taking SEM photographs in two views or more, measuring the maximum diameters of 100 or more primary particles per view, then calculating the average value (arithmetic mean) of these measured values.

Further, in the lithium nickel containing composite oxide of the present invention, a BET specific surface area is 0.35 $m^2/g$ or less, preferably within the range of 0.20 $m^2/g$ to 0.35 $m^2/g$, and more preferably within the range of 0.25 $m^2/g$ to 0.32 $m^2/g$. By making a BET specific surface area suitably small, it is possible to suppress deterioration of surface properties due to repeated charging and discharging, so that it is possible to improve cycling characteristics of obtained secondary battery.

[Peak Intensity Rate]

In a layered rock-salt type crystal structure of a lithium nickel containing composite oxide of the present invention, a peak intensity (the intensity where the background is excluded from the peak top intensity) ratio of (003) plane with respect to (104) plane that are obtained by X-ray powder diffraction using Cu-Kα ray as an X-ray source is 1.2 or more. Disruption of the crystal structure can be judged from this peak intensity ratio "(003)/(104)". For example, when cation mixing occurred, in other words, when the crystal structure becomes closer to a rock-salt type from a layered rock-salt type, X-ray diffraction intensity that belongs to (003) plane becomes small. At this time, the value of a peak intensity ratio "(003)/(104)" becomes small. Therefore, as this peak intensity ratio becomes larger, the layered rock-salt type structure becomes less disrupted.

In the present invention, this peak intensity ratio "(003)/(104)" is preferably 1.5 or more, and more preferably 1.7 or more.

Further, in the present invention, it is preferable that the relationship of peak intensity (the intensity where the background is excluded from the peak top intensity) among (006) plane, (102) plane, and (101) plane that are obtained from X-ray powder diffraction using Cu-Kα ray as an X-ray source satisfies [(006)+(102)]/(101)≤0.6. With this peak intensity ratio [(006)+(102)]/(101), it is possible to judge disruption of a layered rock-salt type structure further in detail.

In the present invention, as a relationship of peak intensity among (006) plane, (102) plane, and (101) plane, it is preferable that [(006)+(102)]/(101) is 0.55 or less, and preferably 0.5 or less.

(2) Manufacturing Method of Lithium Nickel Containing Composite Oxide

The manufacturing method of a lithium nickel containing composite oxide of the present invention comprises:

a mixing process wherein lithium nickel containing composite oxide particles that have a layered rock-salt type crystal structure and mainly contains nickel (Ni) as a transition metal; a lithium compound; and an alkali metal compound are mixed to obtain mixed powder, a first calcination process that calcines the mixed powder at a temperature range of 800° C. to 1000° C. to obtain calcined particles, a washing process that removes alkali metal other than lithium by washing the calcined particles, a second calcination process that mixes the washed calcined particles with a lithium compound to obtain a mixture and calcines the mixture in an oxidizing atmosphere at a temperature range of 600° C. to 800° C. to obtain a lithium nickel containing composite oxide that has a layered rock-salt type crystal structure and has a peak intensity ratio of (003) plane with respect to (104) plane obtained from X-ray powder diffraction using Cu-Kα ray as an X-ray source of 1.2 or more.

As an eventually-obtained lithium nickel containing composite oxide has a composition that is expressed by a general formula: $Li_{1+u}Ni_xCo_yAl_zO_2$ (−0.03≤u≤0.10, x+y+z=1, 0.50≤x≤1.00, 0≤y≤0.50, 0≤z≤0.10), it is preferable to adjust the input amount of lithium nickel containing composite oxide particles and lithium compounds that are mixed in the mixing process and the second calcination process.

[Precursor]

In the present invention, it is characterized in that, as a precursor of an eventually-obtained lithium nickel containing composite oxide, lithium nickel containing composite oxide particles themselves are used as a substitute for nickel containing composite hydroxide or nickel containing composite oxide that was obtained by performing heat treatment on this nickel containing composite hydroxide.

Generally, synthesis of lithium nickel containing composite oxide, for which nickel containing composite oxide or nickel containing composite hydroxide is a precursor, is performed at a high temperature of 700° C. or more. From the aspect of promoting growth of primary particle size and improving crystallinity that affect battery performance, it is preferable that the temperature is high and the reaction time is long. On the other hand, prolongation of heating time promotes cation mixing so that it deteriorates the battery performance.

On the other hand, prolongation of heating time promotes cation mixing so that it deteriorates the battery performance. In order to simultaneously solve these problems which are inconsistent with each other, it is effective to shorten lithiation reaction time of nickel containing composite oxide. In the present invention, from this aspect, by using lithium composite oxide fine particles as a precursor beforehand, it is possible to obtain a desired lithium nickel containing composite oxide in a shortened time and suppress unnecessary cation mixing.

[Mixing Process]

Regarding the mixing method in the above-mentioned mixing process, it is not specifically limited as long as it can uniformly mix these, for example, it is possible to mix by using a mortar or a mixer such as a shaker mixer, a Lödige mixer, a Julia mixer, and a V blender.

(a) Mixing Amount of Alkali Metal Compound in Mixing Process

Regarding the mixing amount of alkali metal compound in the mixing process, it is preferable to be set the ratio of the amount of substance of the alkali metal compound with respect to the total amount of substance of the amount of substance of the metal elements excluding lithium that form the lithium nickel containing composite oxide and the amount of substance of the alkali metal compound becomes to be within a range of 0.55 to 0.99. An alkali metal compound is used as flux when a lithium nickel containing composite oxide is used as a solute. Therefore, the ratio (molar ratio) set in order to set the mixing amount of an alkali metal compound is possible to be suitably set within the above-mentioned range considering the regulatory factors of the flux method such as promotion of crystal growth of a solute. The ratio (molar ratio) is set preferably to be within the range of 0.10 to 0.50.

(b) Species of Flux Used in Mixing Process

Regarding the alkali metal compound, it is preferable to use chloride; carbonate; sulfate; or a mixture of these that contain one or more alkali metal that is selected at least from among lithium (Li), sodium (Na), and potassium (K). As for the flux that is suitable for crystal growth, it is required that it does not form a solid solution with the target compound; it can be easily dissolved and removed by the washing process; and it has suitable balance of chemical bond and ionic bond, ionic radius, ionic valence, and the like. An alkali metal compound does not form a solid solution with a lithium nickel containing composite oxide. In addition, as it dissolves in water, it can be easily dissolved and removed. Further, as the ionic radius of sodium (1.02 Å) and potassium (1.38 Å) is larger than that of lithium (0.76 Å), sodium and potassium have a low possibility of causing desorption of lithium ions within lattice due to ion exchange. Further, they have moderate similarity (lithium ions, alkali metal) and dissimilarity (anion) with a lithium nickel containing composite oxide, which is a solute, and it is expected that they have both solubility of a solute while retaining a high temperature; and crystal precipitation ability while cooling. Therefore, it is assumed that it is possible to develop high-quality primary particles by using an alkali metal compound as flux.

Among these compounds, from the aspect of high solubility to water; easiness of washing removal in the washing process; and having a melting point within a suitable temperature range, it is preferable to use chlorides of alkali metal as flux.

As examples of chlorides, there are lithium chloride (melting point: 605° C.), sodium chloride (melting point 801° C.), potassium chloride (melting point 776° C.), or mixtures of these, such as a mixture having an eutectic composition. These can be suitably selected to be used in order to control the degree of crystal growth.

(c) Mixing Amount of Lithium Compound in Mixing Process

In the mixing process, the mixing amount of the lithium compound is preferably set so that the ratio (molar ratio) of the amount of substance of Li in the lithium compound with respect to the amount of substance of the metal elements excluding lithium that form the lithium nickel containing composite oxide to be within a range of 0 to 0.30. The lithium compound becomes a lithium source that supplies lithium components that volatilize in the first calcination process. From the aspect of ease of handling and obtainment, it is possible to select and use from among hydroxide, chloride, oxide, other mineral salts, or any arbitrary organic salts. This is the same in the second calcination process.

[First Calcination Process]

The first calcination process is a process to calcine the mixed powder of lithium nickel containing composite oxide particles, a lithium compound, and an alkali metal compound, which was obtained in the mixing process, at a temperature range of 800° C. to 1000° C. to obtain calcined particles (sintered compact of lithium nickel containing composite oxide particles).

Regarding the furnace that is used in the calcination process, it is not specifically limited, and either of a batch type or continuous type of furnace can be used as long as it is possible to calcine the mixed powder that was obtained in the mixing process in an air atmosphere or an oxygen air flow. This is the same in the second calcination process.

(a) Calcination Atmosphere

The atmosphere in the first calcination process is generally air atmosphere, however, it is preferable to make it an oxidizing atmosphere as it hardly causes cation mixing. It is more preferable to make the oxygen concentration of the atmosphere to be within a range of 18 volume % to 100 volume %, and it is particularly preferable to make it a mixed atmosphere of oxygen and an inert gas that has the above-mentioned oxygen concentration. That is, it is preferable that the calcination is performed in an air atmosphere or an oxygen air flow, and it is more preferable to perform it in an oxygen air flow considering the battery characteristics.

(b) Calcination Temperature

The calcination temperature in the first calcination process is preferably higher than the temperature around the melting point of the flux to be mixed, that is, it should be within a range of 800° C. to 1000° C., preferably within a range of 830° C. to 900° C. When the calcination temperature is less than 800° C., melting of flux of the alkali metal compound is insufficient so that there is a probability that the growth of the crystal of lithium nickel containing composite oxide, which is a solute, would not be promoted. On the other hand, when the calcination temperature exceeds 1000° C., although it is possible to enlarge primary particles, cation mixing occurs and its crystallinity lowers. Further, there is a possibility that lithium components from a lithium nickel containing composite oxide excessively volatilize and it gives an adverse effect to the characteristics because deviation from a predetermined composition becomes large.

In the present invention, the rate of temperature rise from the room temperature (25° C.) to a calcination temperature and the rate of temperature drop from a calcination temperature to the room temperature (25° C.) in the first calcination process is arbitrary so the present invention is not limited by these elements, however, the rate of temperature rise is within a range of 30° C./h to 1500° C./h, preferably within a range of 60° C./h to 1000° C./h. When the rate of temperature rise is high, the temperature of a sample unevenly rises, so dissolution of a solute by flux tends to be uneven. When the rate of temperature rise is low, time for calcination process becomes longer, so a problem in productivity may arise. The rate of temperature drop is within a range of 30° C./h to 1000° C./h, preferably within a range of 60° C./h to 500° C./h. When the rate of temperature drop is high, the rate of reprecipitation of a solute becomes high so that there is a concern that the crystallinity of a lithium nickel containing composite oxide may lower. When the rate of temperature drop is low, a problem in productivity may arise.

(c) Calcination Time

In the first calcination process, the time for retaining calcination temperature (calcination time) is preferably 10 hours or less, more preferably 4 hours or less. When calcination is performed for 10 hours or more, although the particle size becomes large, volatilization of lithium components from a lithium nickel containing composite oxide excessively proceeds and there is a probability that the crystallinity lowers. In the present invention, lithium nickel containing composite oxide particles, which are a precursor, are already sintered, so it is arbitrary whether or not to retain mixed powder at a calcination temperature. Even when the calcination time is zero, when the temperature reaches the above-mentioned certain calcination temperature (800° C. or more), lithium is properly supplied, and dissolution of a solute by flux and crystal growth promoting effect by reprecipitation can be obtained so that it is possible to enlarge primary particle size. Therefore, as stated above, as long as the calcination temperature reaches the range between 800° C. and 1000° C., even when the calcination time is zero, it is included in the first calcination process where mix powder is calcined within a temperature range of 800° C. to 1000° C. to obtain calcined particles.

[Washing Process]

The washing process is a process to wash calcined particles that were obtained in the calcination process, and remove components (alkali metal element) that derive from the alkali metal compound that are flux.

The washing method is not specifically limited, and known methods can be used. For example, a method can be employed where calcined particles are put into a liquid capable dissolving alkali metal elements, specifically, water or alcohol, and agitated, and after dissolving a residue of alkali metal elements, taking calcined particles with a known filtering method.

[Second Calcination Process]

The second calcination process is where the calcined particles or the mixture of calcined particles and a lithium compound are calcined again at a temperature within a range of 600° C. to 800° C. in an oxidizing atmosphere after performing the above-mentioned washing process. By doing this, in the first calcination process, it is possible to restore the crystal structure that was disrupted by the cation mixing and prevent deterioration of characteristics such as charging and discharging capacity.

(a) Calcination Atmosphere

In order to prevent cation mixing, the atmosphere in the second calcination process is preferably to be an oxidizing atmosphere as same as the atmosphere in the first calcination process, and it is more preferable that the oxygen concentration of the atmosphere is within a range of 18 volume % to 100 volume %, and it is particularly preferable that the atmosphere is a mixture of oxygen and an inert gas that has the above-mentioned oxygen concentration.

(b) Calcination Temperature

The calcination temperature in the second calcination process needs to be higher than the temperature where a solid phase reaction between the calcined particles after washing and lithium compound occurs and diffusion of lithium proceeds. However, in order to suppress volatilization of lithium, it is preferable to set the calcination temperature to be within a range of 600° C. to 800° C.

By calcining the calcined particles or the mixture of the calcined particles and lithium compound, it is possible to prevent mixing nickel into 3a site in the layered rock-salt type structure while the lithium compound melts down and lithium disperses. Therefore, it is possible to effectively restore temporarily disrupted crystal structure. On the other hand, when the calcination temperature is below 600° C., such effect cannot be sufficiently obtained. However, when the calcination temperature exceeds 800° C., there is a possibility that lithium components excessively volatilize.

In the present invention, the rate of temperature rise from the room temperature (25° C.) to the calcination temperature in the second calcination process and the rate of temperature drop from the calcination temperature to the room temperature (25° C.) are arbitrary, and the present invention is not limited by these elements. However, it is preferable that the rate of temperature rise is within a range of 30° C./h to 1500° C./h, preferably within a range of 60° C./h to 1000° C./h, and the rate of temperature drop is within a range of 30° C./h to 1000° C./h, preferably within a range of 60° C./h to 500° C./h. When the rate of temperature rise and the rate of temperature drop are high, heat distribution of a sample tends to be ununiform while the temperature rise and drop, so it is thought that the crystallinity of a lithium nickel containing composite oxide tends to be vary. When the rate of temperature rise and the rate of temperature drop are low, a problem in productivity may arise.

(c) Calcination Time

In the second calcination process, it is preferable to set the time to retain the above-mentioned calcination temperature (calcination time) to be within a range of 1 hour to 20 hours, preferably 2 hours to 8 hours. When this calcination time is less than 1 hour, it is impossible to sufficiently restore the crystal structure, and as a result, it becomes impossible to obtain sufficient charging and discharging capacity.

EXAMPLES

The present invention is described in additional detail by the examples of the present invention and comparative examples provided below. However, the examples are merely illustrative of the invention, and as long as they do not deviate from the scope of the invention, the present invention is in no way limited to or by these examples.

Example 1

(1) Producing Lithium Nickel Containing Composite Oxide Particles

First, nickel sulfate hexahydrate and cobalt sulfate heptahydrate were dissolved in water at an atomic ratio of Ni:Co=82:15 to prepare 1.9 mol/L of raw material aqueous solution. Sodium hydroxide aqueous solution as a pH adjusting agent and ammonia water as an ammonium ion donor were dripped into this raw material aqueous solution, and the solution temperature was adjusted to be 50° C. and a pH value at a standard solution temperature of 25° C. to be 12.0 to coprecipitate nickel-cobalt composite hydroxide particles.

Next, water was added to these nickel-cobalt composite hydroxide particles to form a slurry. While stirring this slurry, 1.7 mol/L of sodium aluminate solution and 64 volume % of sulfuric acid as a pH adjusting agent were added at an atomic ratio of Ni:Co:Al=82:15:3, and the pH value at a standard solution temperature of 25° C. was adjusted to be 9.5, and by further stirring for another one hour, the surface of nickel-cobalt composite hydroxide particles were coated by aluminum compounds.

The obtained aluminum-coated nickel-cobalt composite hydroxide particles (hereinafter referred to as "composite hydroxide particles") were washed, filtered, and dried to obtain powder composite hydroxide particles. As a result of analysis on Ni, Co, and Al components by ICP emission spectrophotometry, it was found that this composite hydroxide particles are expressed by a general formula: $Ni_{0.82}Co_{0.15}Al_{0.03}(OH)_2$.

These composite hydroxide particles and lithium hydroxide monohydrate were mixed at a predetermined ratio of amount of substance, and by calcining this lithium mixture in an oxygen atmosphere at 730° C. for 24 hours, lithium nickel containing composite oxide particles as a starting material of the present invention (more specifically, lithium nickel cobalt aluminum composite oxide particles) were obtained. As a result of analyzing the element fraction (atomic ratio) of the calcined particles by an ICP emission spectrophotometry on Li, Ni, Co, and Al, it was found that the calcined particles are expressed by a general formula: $Li_{1.03}Ni_{0.82}Co_{0.15}Al_{0.03}O_2$. 

(2) Producing Lithium Nickel Containing Composite Oxide (2-1) Mixing Process

The lithium nickel containing composite oxide particles obtained in the above; lithium hydroxide monohydrate (Wako Pure Chemical Industries Co., Ltd.; purity of 98.0% to 102.0%) as a lithium compound; and sodium chloride (Wako Pure Chemical Industries Co., Ltd.; purity of 99.5%) as an alkali metal compound were weighed and mixed so that the ratio of the amount of substance of Li in the lithium compound with respect to the sum of the amount of substance of nickel and cobalt and aluminum elements of the lithium nickel containing composite oxide particles was to be 0.2, and, the ratio of the amount of substance of sodium chloride with respect to the sum of the amount of substance of nickel and cobalt and aluminum elements of the lithium nickel Containing composite oxide particles was to be 0.2, and obtained mixed powder.

(2-2) First Calcination Process

Calcined particles were obtained by calcination, by heating the above-mentioned mixed powder at the rate of temperature rise of 1000° C./h from the room temperature (25° C.) to 830° C. in an oxygen atmosphere and retained at 830° C. for 2 hours, then cooling at the rate of temperature drop of 200° C./h.

(2-3) Washing Process

Next, put the obtained calcined particles in a beaker and added about 1000 ml of water (temperature 90° C.) with respect to 2 grams of calcined particles to wash. After that, flux components were removed by way of suction filtration and the obtained calcined particles were dried at a temperature of 120° C. for 5 hours in a vacuum-constant temperature drying apparatus. As a result of analyzing the element fraction (atomic ratio) of these dried calcined particles by an ICP emission spectrophotometry on Li, Ni, Co, and Al, it was found that the calcined particles were $Li_{0.97}Ni_{0.82}Co_{0.15}Al_{0.03}O_2$.

(2-4) Second Calcination Process

After weighing lithium hydroxide monohydrate to be 0.05 amount of substance with respect to lithium nickel cobalt composite oxide particles (calcined particles) as amount that compensates for a shortage of Li in the composition formula obtained by an ICP emission spectrophotometry, and mixing it with washed calcined particles in a mortar, the mixture was calcined by rising temperature in an oxygen atmosphere from the room temperature (25° C.) to 750° C. at the rate of temperature rise of 1000° C./h and retaining at 750° C. for 5 hours, and then by dropping temperature at the rate of temperature drop of 200° C./h, lithium nickel containing composite oxide (lithium nickel cobalt aluminum composite oxide) as a cathode active material was obtained.

As a result of analyzing components of Li, Ni, Co, Al by an ICP emission spectrophotometry, it was found that the element fraction (atomic ratio) of the eventually-obtained particles was $Li_{1.02}Ni_{0.8}Co_{0.02}Al_{0.022}O_2$ as with the estimated constituent element ratio (atomic ratio).

By powder X-ray diffraction measurement (employed device: X'pert Pro MPD manufactured by Spectris Co., Ltd.; measurement condition: Cu-Kα ray, accelerating voltage 45 kV), it was found that it has a layered rock-salt type crystal structure (α-NaFeO$_2$ structure). The peak intensity ratio [(003)/(104)] obtained by powder X-ray diffraction strength was 0.48. Lithium occupancy rate obtained by a Rietvelt analysis was 98.0%.

Observation by SEM (employed device: JCM-5700 manufactured by JEOL Ltd.) revealed that the average particle size of primary particles was 3.4 μm. It was further found that the BET specific surface area of the powder was 0.31 m$^2$/g, and the content of sodium derived from flux components was 0.51 atomic % (when the sum of the numbers of atoms of Ni, Co, Al was to be 100).

(3) Producing Secondary Battery and Evaluation

The cathode active material of the obtained lithium nickel containing composite oxide was used as a cathode material of a secondary battery, and evaluation of its battery characteristics was performed. Specifically, charge and discharge characteristics and retention characteristics were measured and performed a good or bad judgment to see if the cathode active material of the obtained lithium nickel containing composite oxide has an aptitude when it is used as a cathode active material.

Figure 4:
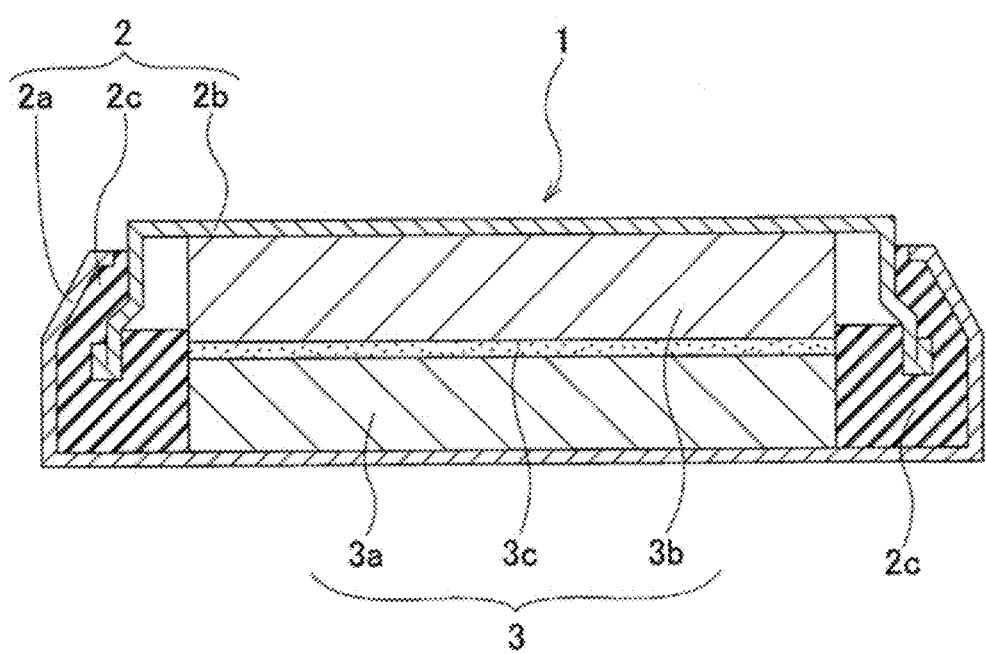
FIG. 4 is a schematic cross-sectional view of a 2032-type coin battery that was used for evaluation.

2032-type coin battery 1 as illustrated in FIG. 4 was produced. This 2032-type coin battery 1 comprises a case 2 and electrode 3 that is housed inside the case 2.

The case 2 has a cathode can 2a that is hollow and that is opened on one end, and an anode can 2b that is arranged in the opening section of this cathode can 2a, and is constructed so that when the anode can 2b is arranged in the opening section of the cathode can 2a, a space is formed between the anode can 2b and the cathode can 2a that houses the electrode 3.

The electrode 3 comprises a cathode 3a, a separator 3c and an anode 3b that are layered in that order, and housed in the case 2 so that the cathode 3a comes in contact with the inner surface of the cathode can 2a, and the anode 3b comes in contact with the inner surface of the anode can 2b.

The case 2 comprises a gasket 2c, and is secured by this gasket 2c so that the cathode 2a and anode 2b are maintained in an electrically insulated state. Moreover, the gasket 2c has a function of sealing the gap between the cathode can 2a and anode can 2b so that the inside of the case 2 is sealed off from the outside so as to be airtight and fluid-tight.

This 2032-type coin battery 1 was manufactured as described below. First, after weighing the above-mentioned cathode active material to be 90 volume %, acetylene black to be 5 volume %, and PVDF to be 5 volume %, and mixing these, and then, adequate amount of NMP (n-methylpyrrolidone) was added to this to prepare a paste. This positive electrode mixture paste was applied to the surface of aluminum foil so that the surface density of cathode active material becomes to be within a range of 3 mg/cm$^2$ to 5 mg/cm$^2$. After drying it at 120° C. under a vacuum environment, by piercing it so that it becomes a disc having a diameter of 14 mm, cathode 3a was produced. Here, lithium metal was used for anode 3b, a mixed solution that includes ethylene carbonate (EC) of which support salt is LiPF$_6$ of 1M and diethyl carbonate (DEC) at a rate of 3:7 was used for electrolyte, and the 2032-type coin battery 1 was assembled in a glove box where the dew point is controlled to be −80° C.

[Charging and Discharging Capacity]

The 2032-type coin battery 1 was left for 24 hours after its production, and after the open circuit voltage (OCV) became stable, the coin battery 1 was charged to a cut-off voltage of 4.3 V with the current density with respect to the cathode active material being 10 mA/g, and after stopping for one hour, the coin battery 1 was discharged to a cut-off voltage of 3.0 V to perform a charge and discharge test to measure the discharging capacity, and by obtaining the initial discharging capacity, charging and discharging capacity was evaluated. To measure the charging and discharging capacity, multi-channel voltage/current generator (manufactured by Advantest Corporation; R6741A) was used.

[Retention Characteristics]

The 2032-type coin battery 1 was left for 24 hours after its production, and after the open circuit voltage (OCV) became stable, at 60° C., the current density with respect to the cathode was set to be 100 mA/g with respect to the cathode active material weight and constant current charging was performed while setting a cut-off voltage to be 4.300 V. After that, while retaining the voltage at 4.300 V, constant current charging was performed until the current value became 10 mA/g. After leaving the coin battery 1 at 60° C. for 70 hours, the battery voltage was measured.

Production conditions of Example 1 and evaluation results of the characteristics of the secondary battery are shown in Table 1 and Table 2.

Example 2

Except for changing the calcination temperature and the calcination time in the first calcination process to 850° C. and 0 hours, under the same condition as of Example 1, a cathode active material of lithium nickel containing composite oxide was obtained. The lithium occupancy rate and average primary particle size of the obtained cathode active material were measured, and a secondary battery using this cathode active material as a cathode material was produced and its initial discharging capacity was measured.

Example 3

Except for changing the calcination temperature and the calcination time in the first calcination process to 850° C. and 2 hours, under the same condition as of Example 1, a cathode active material of lithium nickel containing composite oxide was obtained. The lithium occupancy rate and average primary particle size of the obtained cathode active material were measured, and a secondary battery using this cathode active material as a cathode material was produced and its initial discharging capacity was measured.

Example 4

Except for changing the calcination temperature and the calcination time in the first calcination process to 900° C. and 0 hours, under the same condition as of Example 1, a cathode active material of lithium nickel containing composite oxide was obtained. The lithium occupancy rate and average primary particle size of the obtained cathode active material were measured, and a secondary battery using this cathode active material as a cathode material was produced and its initial discharging capacity was measured.

Comparative Example 1

Except for changing the calcination temperature and the calcination time in the first calcination process to 900° C. and 5 hours, and not performing the second calcination process, under the same condition as of Example 1, a cathode active material of lithium nickel containing composite oxide was obtained. The lithium occupancy rate and average primary particle size of the obtained cathode active material were measured.

Comparative Example 2

Except for making the input amount of lithium hydroxide monohydrate in the mixing process to be 0.1 times amount of substance with respect to the amount of substance of lithium nickel containing composite oxide particles as a starting material; changing the calcination temperature and the calcination time in the first calcination process to 900° C. and 5 hours; and not performing the second calcination process, under the same condition as of Example 1, a cathode active material of lithium nickel containing composite oxide was obtained. The lithium occupancy rate and average primary particle size of the obtained cathode active material were measured.

Comparative Example 3

Except for not putting lithium hydroxide monohydrate in the mixing process; changing the calcination temperature and the calcination time in the first calcination process to 900° C. and 5 hours; and not performing the second calcination process, under the same condition as of Example 1, a cathode active material of lithium nickel containing composite oxide was obtained. The lithium occupancy rate and average primary particle size of the obtained cathode active material were measured, and a secondary battery using this cathode active material as a cathode material was produced and its initial discharging capacity was measured.

Comparative Example 4

Under the same condition as of the (1) Producing Lithium Nickel Containing Composite Oxide Particles as in Example 1, cathode active material of lithium nickel containing composite oxide was obtained. The lithium occupancy rate, average primary particle size, and BET specific surface area of the obtained cathode active material were measured, and a secondary battery using this cathode active material as a cathode material was produced, and its initial discharging capacity and a voltage after storage were measured.

TABLE 1

|  | NaCl/ (NCA + Nacl) | Li/ NCA | First Calcination | | Second Calcination | | X-ray Diffraction Intensity | |
|---|---|---|---|---|---|---|---|---|
|  |  |  | Calcination Temperature (° C.) | Calcination Time (hr) | Calcination Temperature (° C.) | Calcination Time (hr) | [(003)/ (104)] | [(006) + (102)]/ (101) |
| Ex. 1 | 0.20 | 0.20 | 830 | 2 | 750 | 5 | 1.91 | 0.48 |
| Ex. 2 | 0.20 | 0.20 | 850 | 0 | 750 | 5 | 2.26 | 0.44 |
| Ex. 3 | 0.20 | 0.20 | 850 | 2 | 750 | 5 | 1.72 | 0.51 |
| Ex. 4 | 0.20 | 0.20 | 900 | 0 | 750 | 5 | 2.23 | 0.45 |
| Com. Ex. 1 | 0.20 | 0.20 | 900 | 5 | — | — | 1.75 | 0.63 |
| Com. Ex. 2 | 0.20 | 0.10 | 900 | 5 | — | — | 1.64 | 0.63 |
| Com. Ex. 3 | 0.20 | 0 | 900 | 5 | — | — | 1.67 | 0.66 |
| Com. Ex. 4 | — | — | — | — | — | — | 1.99 | 0.41 |

TABLE 2

|  | Lithium Occupancy (%) | Average Primary Particle Size (μm) | Specific Surface Area (m²/g) | Initial Discharging Capacity (mAh/g) | Voltage After Storage (V) |
|---|---|---|---|---|---|
| Example 1 | 98.4 | 3.4 | 0.31 | 182 | 4.211 |
| Example 2 | 98.5 | 2.1 | — | 182 | — |
| Example 3 | 97.2 | 4.3 | — | 174 | — |
| Example 4 | 97.2 | 3.5 | — | 171 | — |
| Com. Ex. 1 | 93.0 | 6.8 | — | — | — |
| Com. Ex. 2 | 91.7 | 6.4 | — | — | — |
| Com. Ex. 3 | Com. Ex. | 5.1 | — | 117 | — |
| Com. Ex. 4 | 98.9 | 0.4 | 0.35 | 200 | 4.203 |

As a result of the above evaluation, when the cathode active material of lithium nickel containing composite oxide of Example 1 is compared to the cathode active material of conventional lithium nickel containing composite oxide of Comparative Example 4, it is understood that it has excellent storage characteristics while retaining the initial discharging capacity at the same level. It is thought that the high initial discharging capacity and the improvement of storage characteristics in the present invention were achieved since the cathode active material synthesized by the present invention has a large primary particle size so that it is less affected by grain boundaries, and the crystallinity became higher by a synthesis using specific flux.

EXPLANATION OF THE REFERENCE NUMBERS

1 Coin Battery
2 Case
2a Cathode Can
2b Anode Can
2c Gasket
3 Electrode
3a Cathode
3b Anode
3c Separator

The invention claimed is:

1. A lithium nickel containing composite oxide mainly containing nickel as a transition metal,
the lithium nickel containing composite oxide having a layered rock-salt type crystal structure,
wherein the lithium nickel containing composite oxide is composed of primary particles that do not have grain boundaries;
wherein the average primary particle size is 2.0 μm or more and the BET specific surface area is 0.35 m$^2$/g or less;
wherein a peak intensity ratio of (003) plane with respect to (104) plane that are obtained by X-ray powder diffraction using Cu-Kα ray as an X-ray source is 1.2 or more; and
wherein a peak intensity relationship between (006) plane, (102) plane, and (101) plane that are obtained by X-ray powder diffraction using Cu-Kα ray as an X-ray source satisfies [(006)+(102)]/(101)≤0.6.

2. A lithium nickel containing composite oxide according to claim 1, wherein a lithium occupancy at 3a site in the layered rock-salt type crystal structure obtained by Rietvelt analysis is 96% or more.

3. A lithium nickel containing composite oxide according to claim 1, wherein the lithium nickel containing composite oxide contains cobalt, and/or aluminum as an added element.

4. A lithium nickel containing composite oxide according to claim 1, wherein the lithium nickel containing composite oxide has a composition expressed by a general formula: $Li_{1+u}Ni_xCo_yAl_zO_2$, where −0.03≤u≤0.10, x+y+z=1, 0.50≤x≤1.00, 0≤y≤0.50, 0≤z≤0.10.

5. A manufacturing method of lithium nickel containing composite oxide, comprising steps of:
a mixing process wherein lithium nickel containing composite oxide particles that have a layered rock-salt type crystal structure and mainly contains nickel as a transition metal; a lithium compound; and an alkali metal compound are mixed to obtain mixed powder,
a first calcination process wherein the mixed powder is calcined at a temperature range of 800° C. to 1000° C. to obtain calcined particles,
a washing process wherein alkali metal other than the lithium is removed by washing the calcined particles, and
a second calcination process wherein the washed calcined particles is mixed with a lithium compound to obtain a mixture of these and the mixture is calcined in an oxidizing atmosphere at a temperature range of 600° C. to 800° C. to obtain lithium nickel containing composite oxide that has a layered rock-salt type crystal structure and has a peak intensity ratio of (003) plane with respect to (104) plane that are obtained by X-ray powder diffraction using Cu-Kα ray as an X-ray source of 1.2 or more.

6. A manufacturing method of lithium nickel containing composite oxide according to claim 5, wherein, in the mixing process, the alkali metal compound is mixed in the mixing process so that a ratio of an amount of substance of the alkali metal compound with respect to a sum of an amount of substance of metal elements excluding lithium that form the lithium nickel containing composite oxide particles and the amount of substance of the alkali metal compound becomes to be within a range of 0.55 to 0.99.

7. A manufacturing method of lithium nickel containing composite oxide according to claim 5, wherein chloride, carbonate, sulfate, or a mixture of these containing one or more alkali metal that is selected at least from among Li, Na, and K as the alkali metal compound is used in the mixing process.

8. A manufacturing method of lithium nickel containing composite oxide according to claim 5, wherein the lithium compounds is mixed in the mixing process so that a ratio of the amount of substance of Li in the lithium compounds with respect to an amount of substance of metal elements excluding lithium that form the lithium nickel containing composite oxide particles to be within a range of 0 to 0.30.

9. A manufacturing method of lithium nickel containing composite oxide according to claim 5, wherein a calcination time in the first calcination process is set to 10 hours or less.

10. A manufacturing method of lithium nickel containing composite oxide according to claim 5, wherein a calcination time in the second calcination process is set to be within a range of 1 hour to 20 hours.

11. A manufacturing method of lithium nickel containing composite oxide according to claim 5, wherein an eventually-obtained lithium nickel containing composite oxide is adjusted to have a composition that is expressed by a general formula: $Li_{1+u}Ni_xCo_yAl_zO_2$, where −0.03≤u≤0.10, x+y+z=1, 0.50≤x≤1.00, 0≤y≤0.50, 0≤z≤0.10.

12. A nonaqueous-electrolyte secondary battery comprising a cathode, anode, separator, and nonaqueous-electrolyte, and a lithium nickel containing composite oxide according to claim 1 is used as a cathode material of the cathode.

* * * * *